Feb. 6, 1962 C. C. CURTIS 3,020,324
APPARATUS FOR MELTING HEAT SOFTENABLE MINERAL MATERIAL
Filed Dec. 30, 1958 2 Sheets-Sheet 1

INVENTOR.
CHARLES C. CURTIS
BY
ATTORNEYS

Feb. 6, 1962  C. C. CURTIS  3,020,324
APPARATUS FOR MELTING HEAT SOFTENABLE MINERAL MATERIAL
Filed Dec. 30, 1958  2 Sheets-Sheet 2

INVENTOR.
CHARLES C. CURTIS
BY
ATTORNEYS

United States Patent Office 3,020,324
Patented Feb. 6, 1962

3,020,324
APPARATUS FOR MELTING HEAT SOFTENABLE MINERAL MATERIAL
Charles C. Curtis, Newark, Ohio, assignor to Owens-Corning Fiberglas Corporation, a corporation of Delaware
Filed Dec. 30, 1958, Ser. No. 783,784
12 Claims. (Cl. 13—6)

This invention relates to a method of and apparatus for reducing glass batch or other heat-softenable mineral material to a molten or flowable state at comparatively high temperatures whereby a more homogeneous material is obtained and the melting or softening rate substantially increased over prior methods.

In most prior methods of melting glass batch or processes of reducing mineral material to a softened condition, a melting furnace is employed having walls of refractory. In furnaces of this character utilized in melting glass batch, it is found that if the glass is heated to comparatively high temperatures, the hot glass attacks the refractory causing rapid deterioration thereof, contamination of the glass and a substantial increase in volatiles emanating from the molten glass. In conventional melting furnaces, the melting of the material is not uniform in all areas, hot streaks develop in the body of material and the glass lacks homogeneity.

The present invention relates to a method of melting or rendering flowable mineral material by heating the material in a zone wherein comparatively high temperatures do not adversely affect the walls of the zone whereby the material may be rapidly raised to a high temperature with a consequent increase in the melting rate and without contamination.

An object of the invention resides in a method wherein a batch or quantity of heat-softenable mineral material is subjected to heat of combustion of combustible mixtures in one zone for initially reducing the material to a flowable condition and continuously flowing the material into a second zone and the material agitated in and mechanically conveyed through the second zone concomitantly with the application of electric energy to rapidly elevate the material to a comparatively high temperature.

Another object of the invention is the provision of a melting apparatus especially adapted for reducing glass batch to a molten or flowable state, the apparatus embodying a melting zone lined with material which is substantially unaffected by the glass at high temperature and an agitating means in said zone forming an electrode for establishing flow of electrical energy through the glass to rapidly increase the temperature of and thereby reduce the viscosity of the glass and whereby the glass is more uniformly heated avoiding hot streaks.

Another object of the invention resides in a method of processing fusible mineral material such as glass by heating the material under conditions wherein streaks, cords or stria and batch particles are more readily dissolved and nuclei eradicated which would otherwise engender crystallization.

Another object of the invention resides in an apparatus embodying a tubular melting zone for heat-softenable mineral material in which is disposed a moving means for stirring or agitating the material while a current of electrical energy is flowed through the material to rapidly increase the temperature of the material to 3000° F. or more.

Still another object of the invention is the provision of a melting apparatus particularly usable for melting glass and elevating the temperature substantially above its softening point wherein the material is passed through a metal lined chamber in which a metallic agitating or stirring means advances the material through the chamber and wherein the metal walls of the chamber and the agitating means are utilized as electrodes in flowing electric current through the material.

Still another object is the provision of a melting apparatus or furnace for heat-softenable mineral materials such as glass wherein heat is applied to the glass in at least two defined regions and at different temperatures wherein the glass of the highest temperature is at a lowermost region and accelerates the melting rate.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
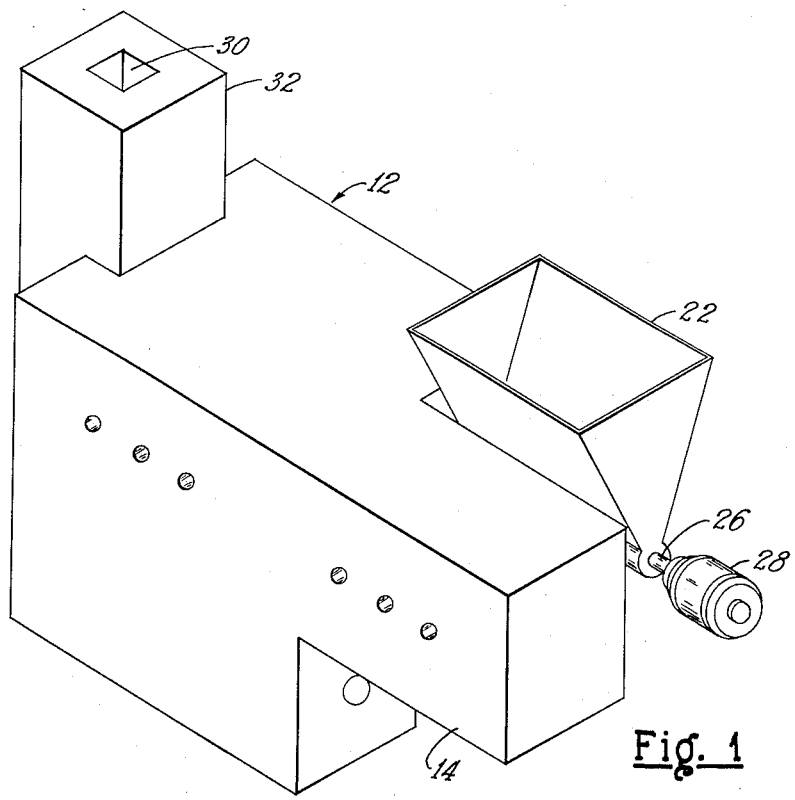
FIGURE 1 is a semi-diagrammatic isometric view of the furnace construction or melting apparatus of the invention.

The method and apparatus of the invention have particular utility in converting or reducing glass batch to a molten condition wherein the molten glass is processed to a high temperature, low viscosity condition. It is to be understood that the method and apparatus may be utilized for processing and conditioning other heat-softenable mineral materials such as slag and fusible rock.

Referring to the drawings in detail, there is illustrated a melting tank, receptacle or furnace embodying the invention adapted to melt and condition glass prior to its delivery from a forehearth through a suitable feeder. The apparatus may be of a size for continuously melting and processing or conditioning an amount of glass desired to be continuously delivered from the forehearth. Where the stream of heat-softened glass is utilized to form fine fibers, the apparatus may be of comparatively small size.

Figure 4:
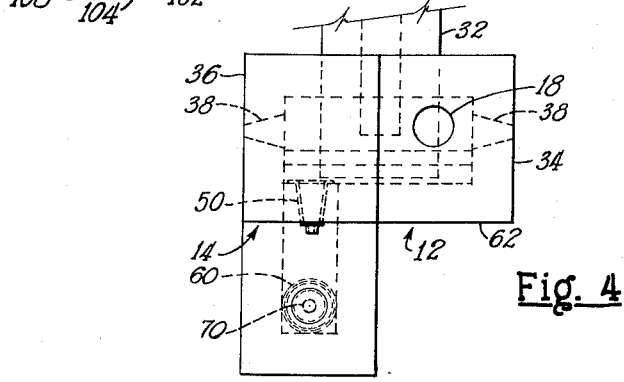
FIGURE 4 is an end view of the arrangement shown in FIGURE 1 with the material feeding means removed.

The melting tank or arrangement includes a substantially rectangularly shaped section 12 which is formed with a forehearth portion 14 projecting from the section 12 at one end thereof and preferably offset as shown in FIGURE 4.

Disposed adjacent the forehearth section 14 is a means for delivering or feeding glass batch into a first melting zone or chamber 16 through an opening 18 formed in a front wall 20 of the section 12. The batch feeding means is inclusive of a hopper 22, the base of which is provided with a feed screw (not shown) carried by a shaft 26 driven or rotated by a motive means or motor 28 shown in FIGURE 1.

The batch material is delivered into the hopper 22 and is continuously advanced by the rotating feed screw into the first melting zone or chamber 16. The melting zone or chamber 16 is vented through a vertical passage 30 formed in a stack 32. The tank or receptacle construction is supported by a suitable frame (not shown). The walls and cover or roof of the section 12 defining the chamber 16 are formed of high temperature resistant refractory. The side walls 34 and 36 are formed with passages 38 through which heat from suitable heating means 39 is projected into the chamber 16.

Figure 3:
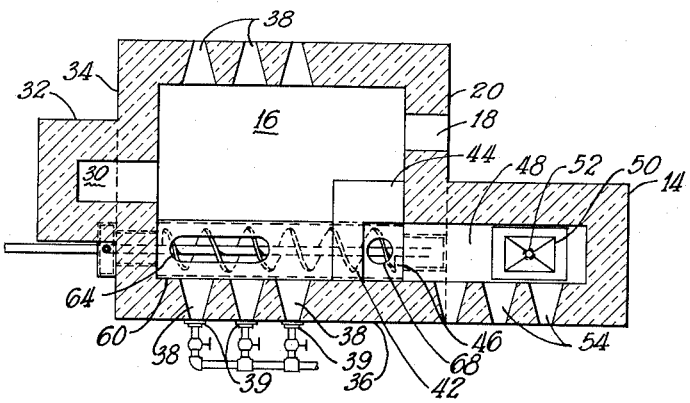
FIGURE 3 is a horizontal sectional view taken substantially on the line 3—3 of FIGURE 2.

The heating means 39 may be gas burners shown in FIGURE 3 for projecting flame through the passages 38 or radiant heaters may be employed for melting the batch. The heat applied to the material in the chamber 16 is such as to soften or melt the glass to a flowable condition within the chamber 16. The normal level of glass within the chamber 16 is indicated at 40.

Disposed in a corner region of the section 12 are vertically arranged walls 42 and 44 which form a vertical glass passage 46 for communication with a forehearth channel 48 formed in the forehearth section 14.

A feeder 50 is provided in the floor of the forehearth 14 which is formed of an orifice 52 through which glass in the forehearth channel 48 flows as a stream and which may be processed to form fibers or for other uses. The walls 42 and 44 defining the passage 46 and the walls defining the forehearth are of high temperature resistant refractory.

A side wall of the forehearth section is formed with passages 54 through which heat is projected into the forehearth to maintain the glass in the channel at the proper viscosity to facilitate its flow or discharge through the orifice 52 of the feeder 50. The apparatus includes a second or supplemental melting zone of a character in which the softened glass from the chamber 16 is further heated by electrical energy to a temperature of 3000° F. or more under conditions such that the increased temperature of the glass does not cause deterioration of the walls of refractory.

Figure 2:
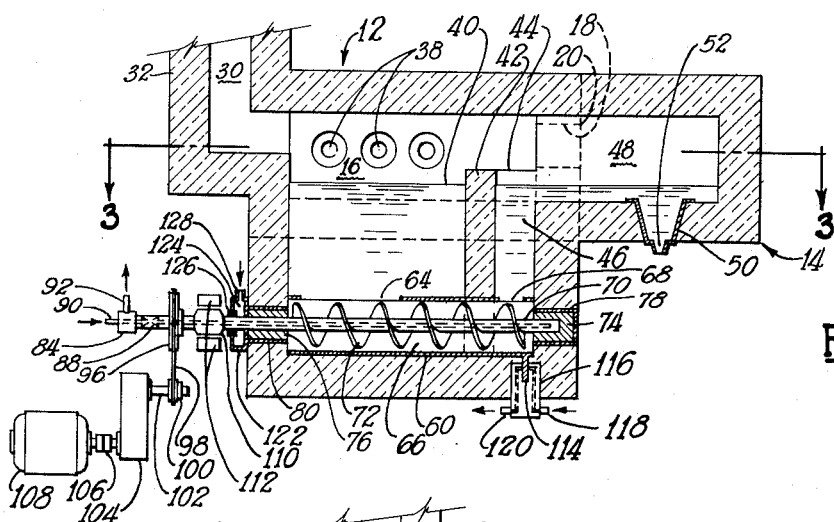
FIGURE 2 is a longitudinal sectional view through the construction illustrated in FIGURE 1.

With particular reference to FIGURES 2 and 3, it will be seen that a tubular member 60 is disposed in the lower region of the chamber 16 adjacent the bottom wall 62 of the section 12. The tube 60 is hollow and of circular cross-section, the upper wall region being formed with an elongated opening or passage 64 to admit the flow or delivery of softened glass from the chamber 16 into the tubular chamber 66 defined by the cylindrical tube 60. The upper region of the wall of the tube in registration with the passage 46 is provided with an opening 68 to facilitate delivery of the glass from the tubular chamber 66 into the vertical passage 46, thence into the forehearth channel 48.

Disposed lengthwise and axially of the tube 60 is a material agitating or stirring means. As shown in FIGURE 2, this means is inclusive of a hollow shaft 70 on which is mounted a stirrer or agitator 72 preferably of spiral or helical shape or configurated so that upon rotation of the shaft 70, the glass from the chamber 16 is drawn into the chamber 66 and advanced by the agitating means lengthwise of the chamber and through the passages 68 and 46.

The tube 60 and the stirrer means or material conveyor 72 form respectively electrodes for flowing electrical energy through the glass in the chamber 66 to elevate it to a temperature of upwards of 3000° F. or more. The shaft 70 of the stirrer or agitator means 72 is journalled in bearings 74 and 76, the material for the bearings being of graphite or other material which will effect a seal to prevent leakage of the molten glass along the shaft. The graphite bearings 74 and 76 are encased within metal shrouds or casings 78 and 80 preferably fashioned of stainless steel, molybdenum, or the like.

As shown particularly in FIGURE 3, the stirrer or agitator means is of helical or spirally-shaped configuration and the shaft 70 is rotated in a direction whereby the means 72 draws the glass from the chamber 16 through the passage or chamber 64 toward the outlet passage 46. The agitator means 72 may be fashioned in the form of radially arranged spaced blades preferably helically or angularly arranged with respect to the axis of the shaft 70 to advance the glass in a right-hand direction as viewed in FIGURE 3 during rotation of the agitator means.

The tube 60 surrounding the agitator means 72 may be made of molybdenum, an alloy of platinum, rhodium, or other metal or current conducting material capable of withstanding the high temperature of the molten glass. It will be noted from FIGURE 3 that the peripheral regions of the agitator electrode or element 72 are spaced only slight distances from the inner surface of the tube 60 so as to provide a minimum gap between the tube and the agitator to facilitate the flow of current through the glass.

The peripheral edges or edge regions of the agitator means 72 must be of sufficient area to provide for satisfactory current flow to the glass. The current through the glass should be of high amperage and comparatively low voltage of from one to four volts. It has been found that a current of about 50 amperes per each square inch of peripheral area of the agitator element or electrode 72 is satisfactory for rapidly increasing the temperature of the glass as it is conveyed through the tube 60.

The peripheral region of the agitator means, whether the same is fashioned as a continuous helix or as spaced radially extending blades, should be devoid of any sharp points, pins or burrs for the reason that current will be more readily discharged from these points or regions and cause excessive wear and erosion of the stirrer means. Furthermore, the peripheral region of the stirrer should be fashioned so as to establish a uniform gap between the stirrer and the inner surface of the tube 60 to assure substantially uniform discharge of current through the glass at all peripheral regions of the stirrer.

By disposing the peripheral region of the stirrer close to the inner surface of tube 60, a maximum shearing and agitating action of the glass is attained during rotation of the electrode 72. The shaft 70 supporting the stirrer means 72 is of hollow or tubular configuration and is adapted to be cooled by a circulating fluid such as water. Arranged at the left end of the shaft 70, as viewed in FIGURE 3, is a fitting 84 which is provided with a rotary seal (not shown) with the shaft extending into the fitting 84, the shaft 70 being supported by an electrically insulated bearing 88.

Extending through the fitting 84 and the hollow interior of the shaft 70 is a cooling fluid supply tube 90. The tube 90 is of substantially lesser diameter than the interior hollow portion of the shaft 70 providing an annular passage for the return flow of the cooling fluid to the fitting 84 and through an outlet pipe or tube 92. The end of the coolant supply tube 90 terminates a short distance from the right-hand end of the bore in the shaft 70 as viewed in FIGURE 3 whereby the cooling fluid is conveyed substantially full length of the shaft 70 and is returned through the annular passage around the inlet tube 90.

The shaft 70 is thus maintained at a safe operating temperature and may be made of stainless steel or the like; its temperature is maintained substantially below that of the glass in the tube 60. Mounted upon the shaft 70 is a pulley 96 which is connected by means of a belt or drive member 98 with a pulley 100 mounted upon an output shaft 102 of a speed reducing mechanism (not shown) contained within a housing 104.

The input shaft of the speed reducing mechanism is connected by means of a coupling 106 with the driving shaft of a motor 108. The speed reducing mechanism in the housing 104 is preferably of a variable speed type for rotating the agitator or stirrer means 72 at a comparatively low speed. The shaft 70 is provided with a current conducting ring 110 which is engaged by brushes 112 connected with a high amperage, low voltage current which is transmitted by the shaft 104 to the glass advancing means 72.

As shown in FIGURE 2, a current conductor 114 is connected to the tube 60 adjacent the right-hand end region thereof, as viewed in FIGURE 2. The conductor 114 is connected with a terminal member 116 preferably formed of copper or other metal having high current conducting characteristics, the conductor being connected with a current supply. The terminal member 116 is preferably of hollow configuration and is adapted to accommodate a circulating cooling fluid such as water. The terminal 116 is provided with fluid inlet and outlet tubes 118 and 120 for the purpose.

The graphite bearing 74 is completely encased in a cup-shaped metal member 78 formed of molybdenum or the like to prevent oxidation of the graphite. The graphite of the bearing 76 is isolated from the atmosphere and protected from oxidation by establishing an inert atmosphere adjacent the bearing. As shown in FIGURE 2, a cylindrically shaped member 122 surrounds the region of the shaft 70 adjacent the end of the graphite bearing 76 providing a chamber or isolated region 124. A sealing gland 126 is disposed between an outer wall of the member 122 and the shaft 70.

The member 122 is provided with a tube or duct 128 for supplying an inert gas or fluid to the chamber 120 under slight positive pressure to isolate the graphite bearing 76 from the atmosphere. Gas such as argon, hydrogen, or the like may be employed for the purpose. The sealing means 126 serves to minimize leakage of the inert gas from the chamber 124.

The operation of the embodiment illustrated in the drawings is as follows: Glass batch or other heat-softenable mineral material is continuously advanced from the hopper 22 by the feeding device connected with the motor 28 into the chamber 16 through the inlet passage 18 in the end wall 20. Heat is directed from flame or radiant heaters through the passages 38 to reduce the glass batch to a molten state within the melting chamber 16.

The motor 108 is energized and rotates the agitator means or movable electrode 72 in a direction and at a comparatively slow speed to draw the glass from the chamber 16 into the chamber 66 and advance the glass toward the right end region of the tube 60 as viewed in FIGURE 3. The stirrer 72 is rotated at the desired speed through the speed reducing means contained within the housing 104. Water or other cooling medium is circulated through the tube 90 to the right-hand end of the hollow shaft 70 thence in a left-hand direction along the tube 90 through the fitting 84 and the outlet passage 92 to maintain the shaft 70 at a reduced, safe operating temperature.

Current is supplied to the brushes 112 engaging the conductor ring 110 for conveying current to the agitator means or electrode 72. The terminal 116 is connected with the metal tube 60 which, with the movable electrode, completes a circuit through the glass contained in the tube 60. Thus during rotation of the agitator means or stirrer 72, current flows from the peripheral areas or regions of the combined helically-shaped stirrer and electrode 72 through the glass to the tube 60, effecting a rapid increase in the temperature of the molten glass as it is advanced through the tube 60 in a right-hand direction as viewed in FIGURE 3.

This action propels or extrudes the glass of increased temperature upwardly through the opening 68 in the tube wall and vertical passage 46 into the forehearth channel 84 adjacent the feeder 50. Heat is supplied through the openings or passages 54 in a side wall of the forehearth portion 14 to maintain the molten glass in the forehearth at an elevated temperature, the molten material being discharged in a stream from the orifice 52 in the feeder. The stream of material may be thereafter processed to form spherical bodies of glass for further processing or the stream of glass may be used for other purposes.

By the method of transferring the molten glass from the chamber 16 into the metal lined or walled chamber 66, the temperature of the glass may be substantially increased in the metal lined or walled chamber 66 through the application of electric current to the glass in the chamber 66 without adversely affecting the refractory defining the first melting chamber 16.

This method minimizes volatilization, prevents hot streaks in the glass and fosters better homogenization of the glass through the working of the glass by the rotating electrode stirrer 72.

It will be apparent that, within the scope of the invention, modifications and different arrangements may be made other than as herein disclosed, and the present disclosure is illustrative merely, the invention comprehending all variations thereof.

I claim:

1. Apparatus of the character disclosed, in combination, a receptacle constructed to contain heat-softenable mineral material, means for heating the material in the receptacle to reduce the material to flowable condition, said receptacle having walls of refractory, a metal walled chamber disposed within the receptacle, said metal walled chamber having a passage to receive heat-softenable material from the receptacle, a relatively movable material agitating means formed of metal disposed within the chamber, means for moving said agitating means to advance the material through said chamber, means engageable with said agitating means and the metal wall of the chamber and connected with a current supply for flowing an electric current through the material in the chamber for heating the material therein at a higher temperature than that of the material in the receptacle, an outlet means for said chamber for discharge of the material therefrom.

2. Apparatus of the character disclosed, in combination, a first receptacle constructed to contain heat-softenable mineral material, means for heating the material in the receptacle to reduce the material to flowable condition, said first receptacle having walls of refractory, a second receptacle formed of metal disposed in the bottom region of the first receptacle and having a passage to receive heat-softened material from said first receptacle, a rotatable metal electrode disposed within said second receptacle and out of contact with the second receptacle, means for rotating the electrode, means provided on the electrode to advance the material through said second receptacle, current conducting means connected with the rotatable electrode and the second receptacle for establishing flow of electric current through the material in said second receptacle for heating the material therein at a higher temperature than that of the material in the first receptacle, and outlet means for said second receptacle for discharge of the material from the second receptacle.

3. Apparatus of the character disclosed, in combination, a first receptacle defined by walls of refractory constructed to contain heat-softenable mineral material, means for heating the material in the receptacle to reduce the material to flowable condition, a second receptacle formed of metal, said second receptacle being formed with a passage to receive heat-softened material from said first receptacle, a relatively movable material agitating means formed of metal disposed within said second receptacle and out of contact with the metal receptacle, means for moving said agitating means to advance the material through said second receptacle, conductors connected with said agitating means and the metal receptacle respectively, said conductors being constructed to supply electric current to said agitator and metal receptacle to establish current flow through the material in the metal receptacle for heating the material therein at a higher temperature than that of the material in the first receptacle, and outlet means for said metal receptacle for discharge of the material therefrom.

4. Apparatus of the character disclosed, in combination, a first receptacle constructed to receive heat-softenable mineral material, means for heating the material in the receptacle to reduce the material to flowable condition, said first receptacle having walls of refractory, a second receptacle disposed within said first receptacle, said second receptacle being formed of metal and having a passage to receive heat-softened material from said first receptacle, a relatively movable material agitating means formed of metal disposed within said second receptacle, means for moving said agitating means to advance the material through said second receptacle, conductors connected with said agitating means and the metal wall of the second receptacle, said conductors being connected with a current supply for flowing an electric current through the material in said second receptacle for heating the material therein at a higher temperature than that of the material in the first receptacle, and outlet means for said second receptacle for discharge of the material from the second receptacle.

5. Apparatus for processing heat-softenable mineral material including, in combination, a receptacle formed with a refractory walled chamber constructed to receive mineral material from a supply, means for applying heat to the material in the refractory walled chamber to reduce the material to a heat-softened condition, a second chamber defined by a wall formed of molydbenum, passage means between said chambers whereby material in the refractory walled chamber is transferred into the second chamber, said metal walled chamber being of elongated configuration, a rotatable agitator disposed in said second chamber, said agitator having peripheral portions formed of molybdenum spaced from the wall of the second chamber, means for rotating said agitator to advance the heat-softened material through the second chamber, an outlet passage through which the material is discharged from the second chamber, said agitator and the metal wall of the chamber forming electrodes, conductors associated with the agitator and metal walled chamber connected with a current supply for flowing an electric current through the mineral material in the second chamber for heating the material therein, and means for cooling the agitator.

6. Apparatus for processing heat-softenable mineral material including, in combination, a receptacle formed with a refractory walled chamber constructed to receive mineral material from a supply, means for applying heat to the material in the refractory walled chamber to reduce the material to a heat-softened condition, a metal walled chamber, passage means between said chambers whereby material in the refractory walled chamber is transferred into the metal walled chamber, said metal walled chamber being of elongated configuration, an agitator formed of metal disposed in said metal walled chamber and being spaced from the wall thereof, means for moving said agitator to advance the heat-softened material through the metal walled chamber, an outlet passage through which the material is discharged from the metal walled chamber, said agitator and the metal wall of the chamber forming electrodes, and conductors associated with the agitator and metal walled chamber connected with a current supply for flowing an electric current through the mineral material in the metal walled chamber for elevating the temperature of the material therein as it is advanced therethrough.

7. Apparatus for processing heat-softenable mineral material including, in combination, a metal walled chamber constructed to contain mineral material, said metal walled chamber being of circular cylindrical shape, a rotatable agitator disposed in said metal walled chamber shaped to advance the material through the metal walled chamber, means for rotating the agitator, said agitator being formed with a peripheral region arranged adjacent to and out of contact with the interior surface of the metal walled chamber, bearings formed of nonmetallic material supporting the agitator, casings supporting the bearing material, means for establishing a zone of inert gas adjacent at least one of the agitator supporting bearings, and current conductors engaging the agitator and the metal wall of the chamber for flowing electric current through the material in the metal walled chamber at the peripheral region of the agitator.

8. Apparatus for processing heat-softenable mineral material including, in combination, a receptacle formed with a refractory walled chamber constructed to receive mineral material from a supply, means for applying heat to the material in the refractory walled chamber to reduce the material to a heat-softened condition, a metal walled chamber, passage means between said chambers whereby material in the refractory walled chamber is transferred into the metal walled chamber, said metal walled chamber being of circular cylindrical shape, a rotatable agitator disposed in said metal walled chamber formed with a helical portion constructed to advance the material through the metal walled chamber, means for rotating the agitator, the peripheral region of the helical portion of the agitator being arranged close to and out of contact with the interior surface of the metal walled chamber, bearings formed of nonmetallic material supporting the agitator, and current conductors engaging the agitator and the metal wall of the chamber for flowing electric current through the material in the metal walled chamber at the peripheral region of the helical portion of the agitator.

9. Apparatus for processing heat-softenable mineral material including, in combination, a receptacle formed with a refractory walled chamber constructed to receive mineral material from a supply, means for applying heat to the material in the refractory walled chamber to reduce the material to a heat-softened condition, a metal walled chamber, passage means between said chambers whereby material in the refractory walled chamber is transferred into the metal walled chamber, said metal walled chamber being elongated and of circular cross-section, a rotatable agitator disposed in said metal walled chamber shaped to advance the material through the metal walled chamber, means for rotating the agitator, said agitator being formed with a peripheral region arranged adjacent and out of contact with the interior surface of the metal walled chamber, bearings formed of nonmetallic material supporting the agitator, and current conductors engaging the agitator and the metal wall of the chamber for flowing electric current through the material in the metal walled chamber at the peripheral region of the agitator.

10. Apparatus for processing heat-softenable mineral material including, in combination, a receptacle formed with a refractory walled chamber constructed to receive mineral material from a supply, means for applying heat to the material in the refractory walled chamber to reduce the material to a heat-softened condition, a metal walled chamber, passage means between said chambers whereby material in the refractory walled chamber is transferred into the metal walled chamber, said metal walled chamber being elongated and of circular cross-section, a rotatable agitator disposed in said metal walled chamber shaped to advance the material through the metal walled chamber, means for rotating the agitator, said agitator being formed with a peripheral region arranged adjacent and out of contact with the interior surface of the metal walled chamber, bearings formed of nonmetallic high temperature resistant material supporting the agitator, metal casing supporting the bearing material, means for establishing a zone of inert gas adjacent at least one of the agitator supporting bearings, and current conductors engaging the agitator and the metal wall of the chamber for flowing electric current through the material in the metal walled chamber at the peripheral region of the agitator.

11. Apparatus for processing heat-softenable mineral material including, in combination, a metal walled receptacle of elongated shape and having a portion of circular cross-section, said receptacle having an inlet passage through which heat-softened material is admitted into the receptacle from a supply, a rotatable agitator disposed in said receptacle provided with means arranged to advance material in said receptacle, means for rotating the agitator, said agitator being formed with a peripheral region adjacent to and out of contact with the circular portion of the metal wall of the receptacle, and means for conducting an electric current to the receptacle and the agitator for establishing current flow from the peripheral region of the agitator through the mineral material to the receptacle for heating the material as it is advanced through the receptacle, said agitator having a passage formed therein to accommodate a circulating cooling fluid.

12. Apparatus for processing heat-softenable mineral material including, in combination, a metal walled receptacle of elongated shape and of circular cross-section, said receptacle being formed with a passage through which heat-softened material is admitted into the receptacle, said receptacle being formed with an outlet, a rotatable electrode disposed in said receptacle provided with a spiral portion arranged to advance material in said receptacle, means for rotating the electrode, the peripheral region of the spiral portion of said electrode being adjacent to and out of contact with the metal wall of the receptacle, and means for conducting an electric current to the receptacle and the electrode for establishing current flow from the peripheral region of the electrode through the mineral material for heating the material as it is advanced through the receptacle toward the outlet, said electrode having a passage formed therein to accommodate a circulating cooling fluid.

References Cited in the file of this patent

UNITED STATES PATENTS

| | | |
|---|---|---|
| 698,766 | Voelke | Apr. 29, 1902 |
| 1,820,247 | Raeder | Aug. 25, 1931 |
| 1,828,442 | Rankin | Oct. 20, 1931 |
| 2,262,070 | Turk | Nov. 11, 1941 |
| 2,515,478 | Tooley | July 18, 1950 |
| 2,616,221 | Hanson | Nov. 4, 1952 |
| 2,707,717 | Seymour | May 3, 1955 |
| 2,859,261 | Arbeit | Nov. 4, 1958 |
| 2,883,798 | Russell | Apr. 28, 1959 |
| 2,888,781 | Fraser | June 2, 1959 |